US009556800B2

(12) United States Patent
Tezuka

(10) Patent No.: US 9,556,800 B2
(45) Date of Patent: Jan. 31, 2017

(54) CONTROL APPARATUS FOR AEROPLANE GAS TURBINE ENGINE

(75) Inventor: Makoto Tezuka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 1088 days.

(21) Appl. No.: 12/861,292

(22) Filed: Aug. 23, 2010

(65) Prior Publication Data

US 2011/0046863 A1 Feb. 24, 2011

(30) Foreign Application Priority Data

Aug. 24, 2009 (JP) ................................. 2009-192933

(51) Int. Cl.
| | |
|---|---|
| *F02C 9/46* | (2006.01) |
| *F01D 21/02* | (2006.01) |
| *F01D 21/14* | (2006.01) |
| *F02C 9/40* | (2006.01) |

(52) U.S. Cl.
CPC ................. *F02C 9/46* (2013.01); *F01D 21/02* (2013.01); *F01D 21/14* (2013.01); *F02C 9/40* (2013.01); *F05D 2270/56* (2013.01)

(58) Field of Classification Search
None
See application file for complete search history.

(56) References Cited

U.S. PATENT DOCUMENTS

| | | | | | |
|---|---|---|---|---|---|
| 4,454,754 | A | * | 6/1984 | Zagranski et al. | 73/112.01 |
| 4,545,198 | A | * | 10/1985 | Yoshida | 60/39.25 |
| 4,716,531 | A | * | 12/1987 | Saunders | G05B 9/03 |
| | | | | | 60/39.091 |
| 6,823,675 | B2 | * | 11/2004 | Brunell | F02C 9/00 |
| | | | | | 60/773 |

FOREIGN PATENT DOCUMENTS

| | | |
|---|---|---|
| JP | 50-59612 | 5/1975 |
| JP | SHO 50-059612 | * 5/1975 |
| JP | 2001-107751 | 4/2001 |
| JP | 2005-509790 | 4/2005 |
| JP | 2005-315237 | 11/2005 |
| WO | 03/042928 | 5/2003 |

* cited by examiner

*Primary Examiner* — Ryan Zeender
*Assistant Examiner* — Denisse Ortiz Roman
(74) *Attorney, Agent, or Firm* — Rankin, Hill & Clark LLP

(57) ABSTRACT

An apparatus for controlling an aeroplane gas turbine engine has various sensors and devices for operating the engine, and two control channels each calculating a command value for controlling operation of the engine based on signals outputted from the sensors. In each of the control channels, it is determined whether any of the sensors and devices is abnormal based on the signals to determine a failure level of the control channel concerned with a numerical value. The failure level is compared with that of the other control channel and based thereon, the command value calculated by the control channel of smaller failure level is sent to the devices. With this, even when both control channels are failed, the engine control can be continued with taking the failure level into account.

16 Claims, 4 Drawing Sheets

FIG.3

| FAILURE LEVEL | CONDITION | ABNORMALITY DETAILS |
|---|---|---|
| LEVEL 0 | NORMAL | NO ABNORMALITY |
| LEVEL 1 | ENGINE START DEFECTIVE | IGNITION UNIT ABNORMAL |
| LEVEL 2 | THRUST PERFORMANCE DEGRADED<br>TRANSIENT PERFORMANCE DEGRADED | FAN ROTATIONAL SPEED (N1) SENSOR ABNORMAL<br>COMPRESSOR OUTLET PRESSURE (P3) SENSOR ABNORMAL<br>ATMOSPHERIC PRESSURE (P0) ABNORMAL |
| LEVEL 3 | THRUST CONTROL DISABLED | BOV ABNORMAL<br>BLEED OFF VALVE (BOV) SENSOR ABNORMAL<br>FAN INLET TEMPERATURE (T1) SENSOR ABNORMAL |
| LEVEL 4 | ENGINE CONTROL DISABLED | FMV ABNORMAL<br>FMV OPENING SENSOR ABNORMAL<br>CORE ROTATIONAL SPEED SENSOR ABNORMAL |

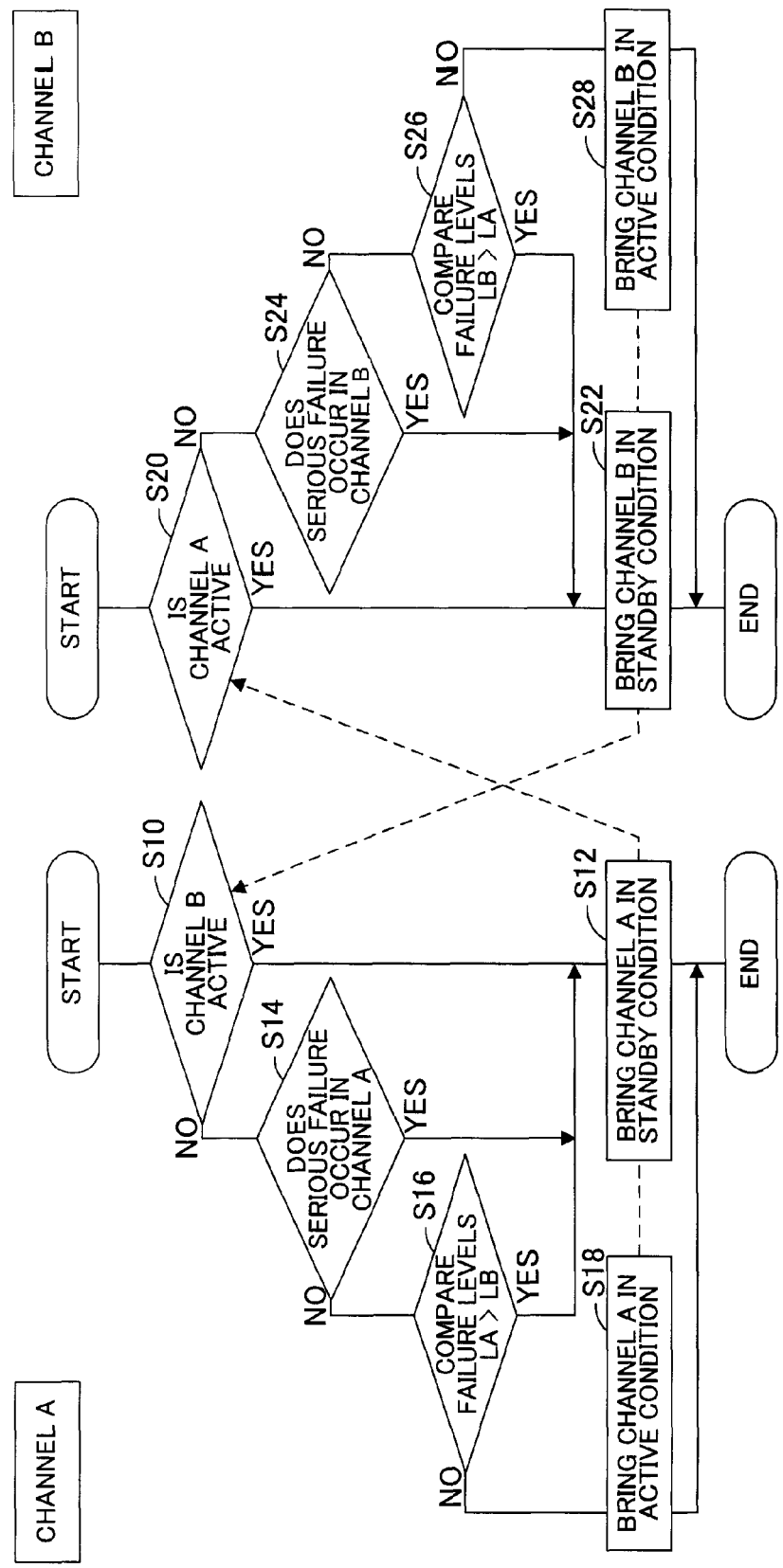

CONTROL APPARATUS FOR AEROPLANE GAS TURBINE ENGINE

BACKGROUND OF THE INVENTION

Field of the Invention

This invention relates to a control apparatus for an aeroplane gas turbine engine.

Description of the Related Art

A control apparatus for an aeroplane gas turbine engine is equipped with two redundant control channels, each of which is inputted with output signals from several kinds of sensors and calculates command values for controlling the operation of the engine based on the output signals, and when one of the control channels which outputs the command value is failed or abnormal, the control channel is switched to the other to output the command values calculated thereby enabling to continue the engine control. as taught by, for example, Japanese Laid-Open Patent Application No. 2001-107751 and U.S. Pat. No. 4,716,531.

SUMMARY OF THE INVENTION

However, the techniques disclosed in the above references are configured on the premise that either one of the two control channels may become abnormal but the other remains normal, and as for the case where both of the control channels become abnormal, they only propose conducting a predetermined engine control, i.e., controlling the engine to stop. Specifically, techniques proposed by the references do not expect to continue the engine control if both of the control channels are failed.

An object of this invention is therefore to overcome the foregoing problem by providing a control apparatus for an aeroplane gas turbine engine in which, even when both control channels are failed, the engine control can be continued with taking the failure level into account.

In order to achieve the object, this invention provides in its first aspect an apparatus for controlling an aeroplane gas turbine engine having a plurality of sensors, a plurality of devices for operating the engine, and two control channels each including a command value calculation unit that calculates a command value for controlling operation of the engine through the devices based on signals outputted from the sensors; each of the control channels comprising: a failure level determiner that determines whether any of the sensors and the devices is abnormal based on the signals outputted from the sensors and determines a failure level of the control channel concerned with a numerical value depending on a degree of abnormality; a transmitter that transmits the determined failure level to other of the control channels; a receiver that receives the failure level at the other of the control channels; an outputting unit that compares the failure level of the control channel concerned with that of the other control channel and sends the command value calculated by the command value calculation unit of the control channel of smaller failure level, to the devices for operating the engine.

In order to achieve the object, this invention provides in its second aspect a method of controlling an aeroplane gas turbine engine having a plurality of sensors, a plurality of devices for operating the engine, and two control channels each including a command value calculation unit that calculates a command value for controlling operation of the engine through the devices based on signals outputted from the sensors; each of the control channels comprising the steps of: determining whether any of the sensors and the devices is abnormal based on the signals outputted from the sensors and determining a failure level of the control channel concerned with a numerical value depending on a degree of abnormality; transmitting the determined failure level to other of the control channels; receiving the failure level at the other of the control channels; comparing the failure level of the control channel concerned with that of the other control channel and sending the command value calculated by the command value calculation unit of the control channel of smaller failure level, to the devices for operating the engine.

BRIEF DESCRIPTION OF THE DRAWINGS

The above and other objects and advantages of the invention will be more apparent from the following description and drawings in which:

FIG. 3 is an explanatory view for explaining failure levels to be discriminated by a CPU (arithmetic device) shown in FIG. 2; and FIG. 4 is flowcharts showing the operation of the apparatus, specifically the operation of control channels shown in FIG. 2.

DETAILED DESCRIPTION OF THE PREFERRED EMBODIMENT

A control apparatus for an aeroplane gas turbine engine according to a preferred embodiment of the present invention will now be explained with reference to the attached drawings.

Figure 1:
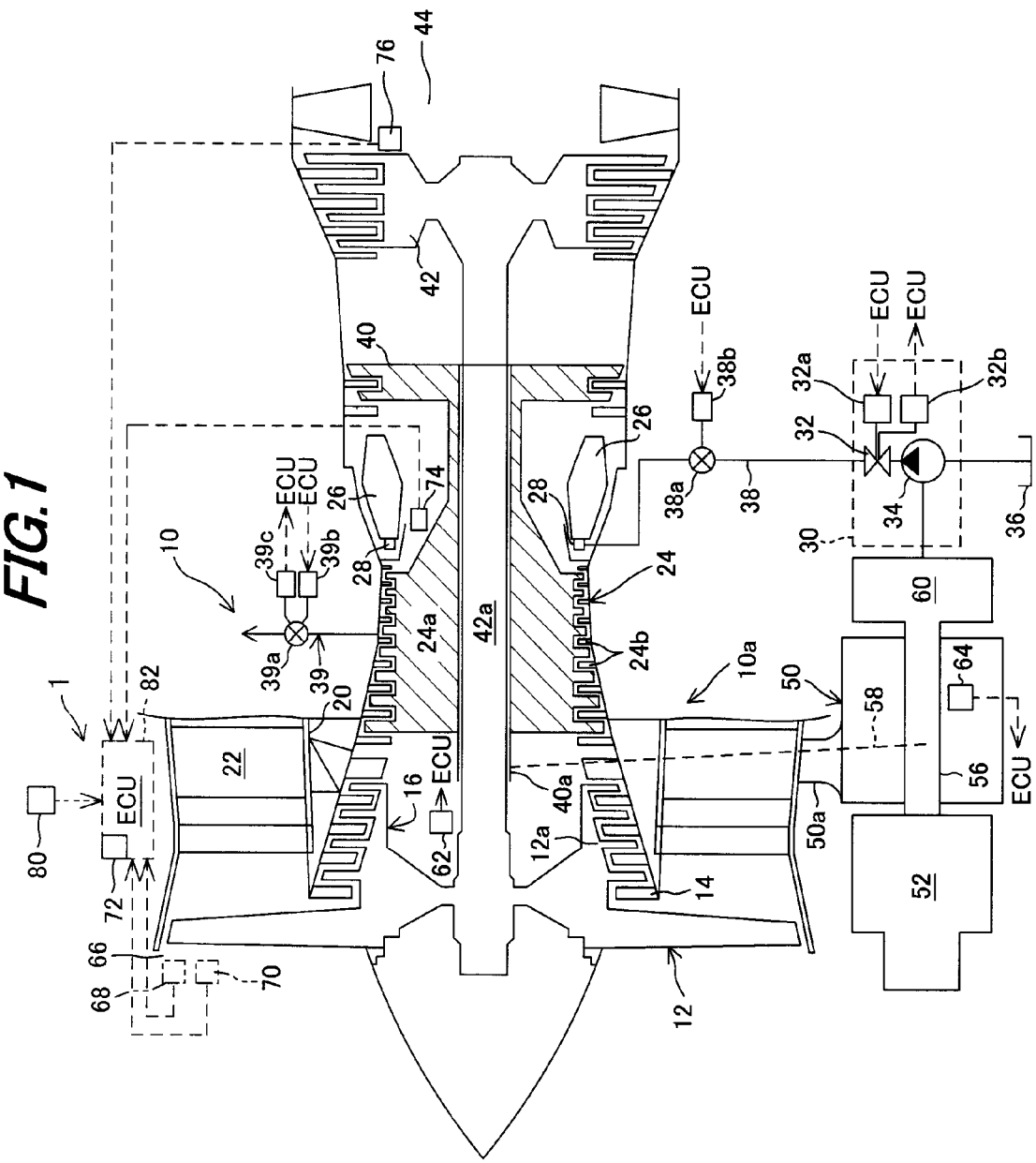
FIG. 1 is an overall schematic view of a gas turbine engine to which a control apparatus for an aeroplane gas turbine engine according to an embodiment of this invention is applied.

FIG. 1 is an overall schematic view of a gas turbine engine to which a control apparatus for an aeroplane gas turbine engine according to an embodiment of this invention is applied.

In FIG. 1, reference numeral 1 designates a control apparatus for an aeroplane gas turbine engine according to this embodiment. The gas turbine engine is explained first for ease of understanding.

Four types of gas turbine engines, i.e., aeroplane gas turbine engines are commonly known: the turbojet engine, turbofan engine, turboprop engine and turboshaft engine. A two-shaft turbofan engine will be taken as an example in the following explanation.

In FIG. 1, reference numeral 10 designates a turbofan engine (gas turbine engine; hereinafter referred to as "engine"). Reference numeral 10a designates a main engine unit. The engine 10 is mounted at an appropriate location of an aircraft (airframe; not shown).

The engine 10 is equipped with a fan (fan blades) 12 that sucks in air while rotating rapidly. A rotor 12a is formed integrally with the fan 12. The rotor 12a and a stator 14 facing it together form a low-pressure compressor 16 that compresses the sucked-in air and pumps it rearward.

A duct or bypass 22 is formed in the vicinity of the fan 12 by a separator or splitter 20. Most of the air pulled in passes through the duct 22 to be jetted rearward of the engine 10 without being burned at a later stage (in the core). The force of the air accelerated rearward by the fan 12 produces a force of reaction that acts on the airframe (not shown), at which the engine 10 is mounted, as a propulsive force (thrust). Most of the propulsion is produced by the air flow from the fan.

The air compressed by the low-pressure compressor 16 flows rearward to a high-pressure compressor 24 where it is further compressed by a rotor 24a and stator 24b and then flows rearward to a combustion chamber 26.

The combustion chamber 26 is equipped with a fuel nozzle 28 that is supplied with pressurized fuel metered by an FCU (fuel control unit or fuel controller) 30. The FCU 30 is equipped with a fuel metering valve (FMV) 32. Fuel pumped by a fuel pump (gear pump) 34 from a fuel tank 36 located at an appropriate part of the airframe is metered or regulated by the fuel metering valve 32 and supplied to the fuel nozzle 28 through a fuel supply line 38.

The fuel metering valve 32 is connected to a torque motor 32a to be opened/closed thereby. Based on a command sent from an electronic control unit (ECU; explained later), the torque motor 32a operates the fuel metering valve 32 to open and close. The ECU outputs a command in accordance with a position of a thrust lever (not shown) manipulated by the pilot (operator). An opening sensor 32b is installed near the fuel metering valve 32 to detect the opening thereof The fuel metering valve 32 is a normally closed type.

A fuel shutoff valve (SOV) 38a is interposed in the fuel supply line 38. The fuel shutoff valve 38a is connected to an electromagnetic solenoid 38b to be opened/closed thereby. Based on a command sent from the ECU, the solenoid 38b operates the fuel shutoff valve 38a to open and close. Specifically, when a shutoff command is outputted, the fuel shutoff valve 38a is closed to shut off the fuel supply to the fuel nozzle 28. The fuel shutoff valve 38a is a normally closed type.

The engine 10 is installed with a hydraulic circuit 39 and a bleed off valve (BOV) 39a for releasing the hydraulic pressure used to open and close the fuel metering valve 32 and fuel shutoff valve 39a. Based on a command sent from the ECU, the bleed off valve 39a is operated with an electromagnetic solenoid 39b energized/deenergized. An opening sensor 39c is installed near the bleed off valve 39c to detect the opening thereof.

The fuel nozzle 28 is supplied with compressed air from the high-pressure compressor 24 and sprays fuel supplied through the fuel supply line 38 using the compressed air. The fuel nozzle 28 comprises an air blast nozzle that uses solely compressed air to make fuel into spray.

The sprayed fuel from the fuel nozzle 28 is mixed with compressed air and the air-fuel mixture is burned after being ignited at engine starting by an ignition unit (not shown) having an exciter and a spark plug. Once the air-fuel mixture begins to burn, the air-fuel mixture composed of compressed air and fuel is continuously supplied and burned.

The hot high-pressure gas produced by the combustion is sent to a high-pressure turbine 40 to rotate it at high speed. The high-pressure turbine 40 is connected to the rotor 24a of the high-pressure compressor 24 through a high-pressure turbine shaft 40a to rotate the rotor 24a to drive the compressor 24.

After driving the high-pressure turbine 40, the hot high-pressure gas is sent to a low-pressure turbine 42 (after passing through the high-pressure turbine 40, the gas becomes lower in pressure than gas sprayed from the combustion chamber 26) to rotate it at relatively low speed. The low-pressure turbine 42 is connected to the rotor 12a of the low-pressure compressor 16 through a low-pressure turbine shaft 42a. The rotor 12a and fan 12 are therefore also rotated. The high-pressure turbine shaft 40a and the low-pressure turbine shaft 42a are provided in a dual concentric structure.

The turbine exhaust gas passing through the low-pressure turbine 42 is mixed with the fan exhaust air passing through the duct 22 without compression or combustion and the combined flow is jetted rearward of the engine 10 through a jet nozzle 44.

An accessory drive gearbox (hereinafter referred to as "gearbox") 50 is attached to the undersurface at the front end of the main engine unit 10a through a stay 50a. An integrated starter/generator (hereinafter called "starter") 52 is attached to the front of the gearbox 50. The FCU 30 is located at the rear of the gearbox 50.

When the engine 10 is started, a starter 52 is operated to rotate a shaft 56 and the rotation thereof is transmitted through a drive shaft 58 (and a gear mechanism including a bevel gear etc. (not shown)) to the high-pressure turbine shaft 40a to generate compressed air. The compressed air is supplied to the fuel nozzle 28, as mentioned above.

The rotation of the shaft 56 is also transmitted to a PMA (Permanent Magnet Alternator) 60 and the (high-pressure) fuel pump 34. The fuel pump 34 is therefore driven to pump and spray metered fuel from the fuel nozzle 28 as explained above. The resulting air-fuel mixture is ignited to start combustion.

When the engine 10 reaches self-sustaining operating speed, the rotation of the high-pressure turbine shaft 40a is transmitted back to the shaft 56 through the drive shaft 58 (and the gear mechanism including the bevel gear etc. (not shown)) to drive the fuel pump 34 and also drive the PMA 60 and starter 52. The PMA 60 therefore generates electricity and the starter 52 also generates electricity to be supplied to the airframe. When electric load on the airframe side is increased, power generated by the starter 52 is increased and rotational load of the high-pressure turbine shaft 40a is increased accordingly, thereby affecting the high-pressure turbine rotational speed, which will be explained later.

An N1 sensor (speed sensor) 62 is installed near the low-pressure turbine shaft 42a of the engine 10 and generates an output or signal proportional to the rotational speed of the low-pressure turbine (rotational speed of the low-pressure turbine shaft 42a) N1. An N2 sensor (speed sensor) 64 is installed near the shaft 56 and generates an output or signal proportional to the rotational speed of the high-pressure turbine (rotational speed of the high-pressure turbine shaft 40a) N2.

A T1 sensor (temperature sensor) 68 and P1 sensor (pressure sensor) 70 are installed near an air intake 66 at the front of the main engine unit 10a and generate outputs or signals proportional to the temperature (ambient temperature of the aircraft) T1 and the pressure P1, respectively, of the inflowing air at that location. A P0 sensor (pressure sensor) 72 is installed inside the ECU explained below and generates an output or signal proportional to atmospheric pressure P0. Further, a temperature sensor (not shown) is installed inside the ECU and generates an output or signal proportional to the temperature of the ECU.

Furthermore, a P3 sensor (pressure sensor) 74 is installed downstream of the rotor 24a and generates an output or signal proportional to the output pressure P3 (pressure at the outlet of the high-pressure compressor 24). An EGT sensor (temperature sensor) 76 is installed at an appropriate location downstream of the low-pressure turbine 42 and generates an output or signal proportional to the exhaust gas temperature EGT (low-pressure turbine outlet temperature). A WOW sensor (weight sensor) 80 is installed near a wheel of the airframe and produces an output or signal indicative of the weight acting on the wheel, i.e., indicating whether the aircraft is on ground.

The aforementioned ECU (now designated by reference numeral 82) is housed in the main engine unit 10a at its upper end. The outputs of the foregoing sensors indicating the operating condition of the engine 10 are sent to the ECU 82. The ECU 82 calculates a Mach number Mn indicating flight speed of the aircraft based on a ratio of the atmospheric pressure P0 to the pressure P1 and the flight altitude ALT based on the atmospheric pressure P0.

It should be noted that, among the foregoing sensors, some sensors are configured to be redundant for safety. Specifically, there are installed the two N1 sensors, four N2 sensors, two T1 sensors, eight EGT sensors, two P0 sensors, two P1 sensors (but no P1 sensor in the case where the signal of Mach number Mn is sent from the airframe side and based thereon, the pressure P1 is calculated), and two P3 sensors.

Based on the outputs of the sensors, the ECU 82 calculates command values for the fuel metering valve 32, fuel shutoff valve 38a and bleed off valve 39a and outputs the calculated command values to the valves 32, 38a, 39a to control the engine operation. Thus, the apparatus 1 comprises at least the ECU 82. The explanation on the ECU 82 will be made in detail.

Figure 2:
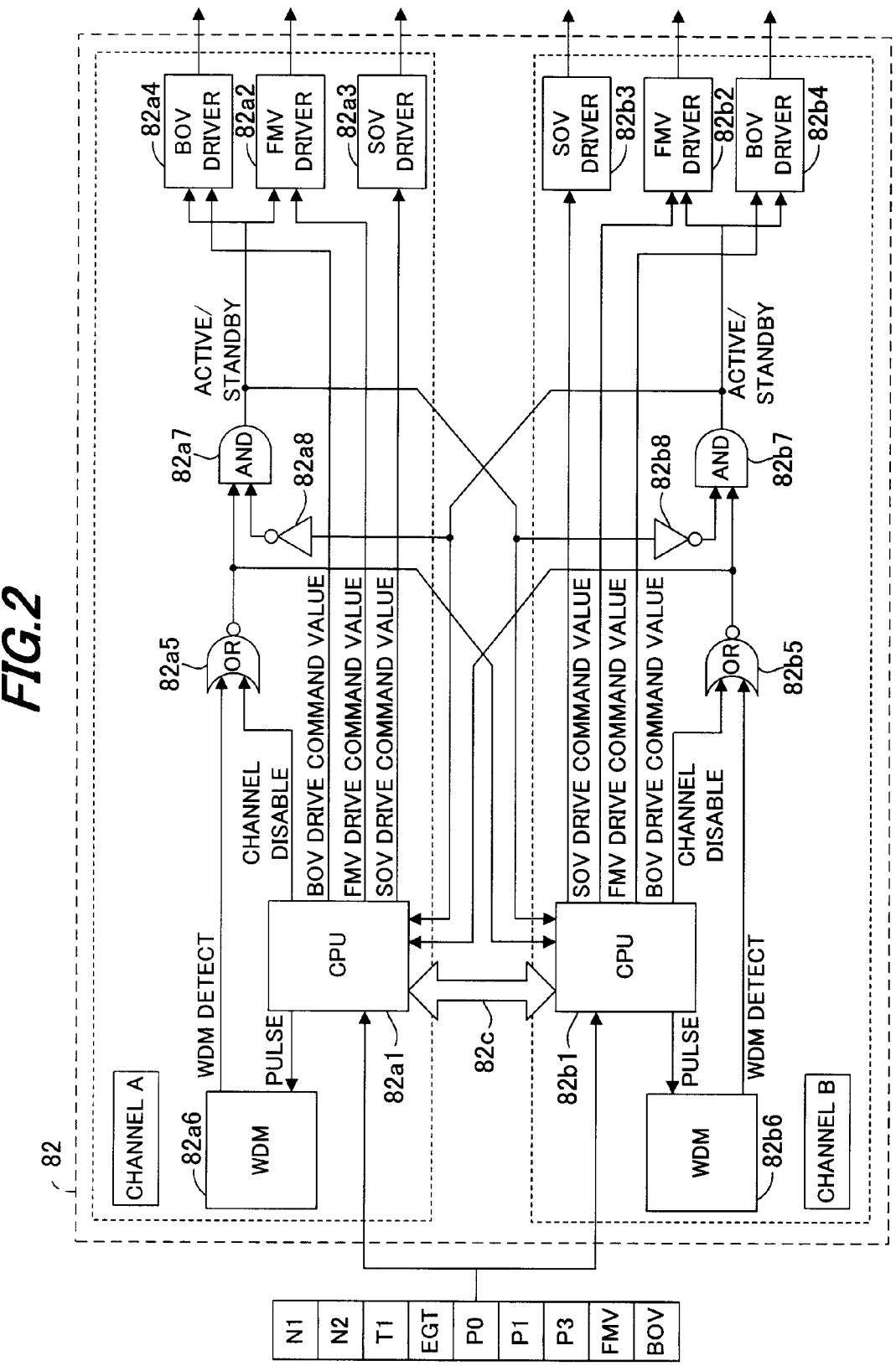
FIG. 2 is a block diagram showing the configuration of an electronic control unit (ECU) comprising two control channels shown in FIG. 1.

FIG. 2 is a block diagram showing the configuration of the ECU 82.

As illustrated, the ECU 82 comprises two control channels of a control channel A (Channel A) and control channel B (Channel B). The control channels A and B include CPUs (Central Processing Units) 82a1, 82b1. Thus the ECU 82 comprises a plurality of microprocessors. The CPUs 82a1, 82b1 are inputted with the output signals from the foregoing sensors (in FIG. 2, the N1 sensor 62, N2 sensor 64 and other sensors are denoted by abbreviated forms like "N1," "N2," etc.).

Based on the inputted output signals, each of the CPUs 82a1, 82b1 calculates drive command values for the fuel metering valve (denoted by "FMV") 32, fuel shutoff valve ("SOV") 38a and bleed off valve ("BOV") 39a and outputs the calculated command values to drivers 82a2, 82a3, 82a4 or 82b2, 82b3, 82b4 which drive the valves 32, 38a, 39a.

Further, based on the inputted output signals, the CPU 82a1, 82b1 detects and determines whether an abnormality is found in any of the sensors and the devices related to the engine control such as the fuel metering valve 32 and bleed off valve 39a (and ignition unit).

With respect to the sensors, when the inputted output signal is not within a permissible range, the sensor associated with the output signal is determined to be abnormal. In the case of two or four redundant sensors, the output signals are compared to each other and when one of the output signals is not identical with the others, it is determined that the sensor associated with the one is abnormal. In addition, when an open signal is outputted upon disconnection of a signal line (wire breaking) between one of the sensors and the CPU, the sensor(s) is determined to be abnormal.

With respect to the devices, based on the premise that the sensors detecting the operation of the devices are normal, when one of the devices is not operated in response to a drive command value generated therefore, the one is determined to be abnormal. In addition, when an open signal is outputted upon disconnection of a signal line between one of the devices and the CPU, the device(s) is determined to be abnormal.

When any of the sensor(s) and device(s) is determined to be abnormal, based on the type and number of the thus-determined device(s) and sensor(s), the CPU 82a1, 82b1 determines the failure level of the control channels A, B with which the CPU 82a1, 82b1 is associated, by using a table prepared beforehand.

FIG. 3 is an explanatory view for explaining the failure levels.

As shown, when no failure is found in the sensors and devices, the control channel concerned is normal and the failure level is defined as 0 (Level 0).

When the ignition unit is determined to be abnormal, it is determined that the engine start is defective and the failure level is defined as 1 (Level 1).

When the N1 sensor (i.e., fan rotational speed (N1) sensor) 62, P3 sensor (compressor outlet pressure (P3) sensor) 74 or P0 sensor (atmospheric pressure (P0) sensor) 72 is determined to be abnormal, it is determined that the thrust performance or transient performance is degraded and the failure level is defined as 2 (Level 2).

When the bleed off valve (BOV) 39a, opening sensor (bleed off valve (BOV) sensor) 39c or T1 sensor (fan inlet temperature (T1) sensor) 68 is determined to be abnormal, it is determined that the thrust control becomes disabled and the failure level is defined as 3 (Level 3).

Further, when the fuel metering valve (FMV) 32, opening sensor (FMV opening sensor) 32b or N2 sensor (core rotational speed (N2) sensor) 64 is determined to be abnormal, it is determined that the engine control becomes disabled and the failure level is defined as 4 (Level 4).

Thus, the CPU 82a1, 82b1 determines the failure level of the associated control channels A, B with a numerical value depending on the degree of failure.

The explanation on FIG. 2 will be resumed. The two control channels A, B are interconnected via a known CAN (controller area network) communication 82c to be able to communicate with each other. Specifically, each of the control channels A, B has a transmitter for transmitting the failure level of itself to the other and a receiver for receiving the failure level of the other so as to transmit/receive their failure levels.

The CPU 82a1, 82b1 compares a value of the failure level of the concerned control channel with that of the other control channel. When the failure level of the concerned control channel is greater (more abnormal) than that of the other, the CPU 82a1, 82b1 sends a signal for disabling the concerned control channel (channel disable signal) to a NOR circuit 82a5, 82b5.

The control channels A, B are also equipped with a watch dog monitor (WDM) 82a6, 82b6 that receives an operation pulse from the associated CPU 82a1, 82b1 to monitor whether operation of the associated CPU 82a1, 82b1 is normal. When the operation of the CPU 82a1, 82b1 is found to be not normal, the watch dog monitor 82a6, 82b6 generates an abnormal signal (WDM detect signal) that is also sent to the NOR circuit 82a5, 82b5.

The output of the NOR circuit 82a5, 82b5, which is a failure determination signal of the concerned control channel, is sent to an associated AND circuit 82a7, 82b7 located downstream thereof, while being also sent to the CPU 82b1, 82a1 of the other control channel.

The output of the AND circuit 82a7, 82b7, which is an Active/Standby determination signal of the associated control channel, is sent to the associated drivers 82a2, 82a4, 82b2, 82b4, while being also sent to the AND circuit 82b7, 82a7 of the other control channel through a NOT circuit 82b8, 82a8, and further sent to the CPU 82b1, 82a1 of the other control channel.

When the failure determination signal indicative of the normal condition of the concerned control channel is outputted and the Standby determination signal is outputted as the Active/Standby determination signal of the other control channel, the AND circuit 82a7, 82b7 outputs the Active signal as the Active/Standby determination signal of the associated control channel.

In the case where the Active signal (H-level signal) is outputted from the AND circuit 82a7, 82b7 to the drivers 82a2, 82a4 or 82b2, 82b4, the drivers 82a2, 82a4 or 82b2, 82b4 inputted with the Active signal convert the FMV and BOV drive command values calculated by the CPU 82a1, 82b1 into current command values to be sent to the fuel metering valve 32 and bleed off valve 39a.

In contrast, when the Standby signal (L-level signal) is outputted from the AND circuit 82a7, 82b7 to the drivers 82a2, 82a4 or 82b2, 82b4, the drivers 82a2, 82a4 or 82b2, 82b4 (inputted with the Standby signal) do not convert the FMV and BOV drive command values into current command values and the command values are not sent to the fuel metering valve 32 and bleed off valve 39a.

The SOV drive command value calculated by the CPU 82a1, 82b1 is converted into the current command value by the driver 82a3, 82b3 and sent to the fuel shutoff valve 38a regardless of the output from the AND circuit 82a7, 82b7.

With the above configuration, in the control channel A for instance, when the failure level of itself is smaller than that of the other, no failure is found in the concerned CPU 82a1, and the control channel B is in a condition (standby condition) where it generates the Standby signal (L-level signal) (i.e., where it does not generate the command value), it makes the control channel A active, in other words, brings the control channel A in a condition (active condition) where it generates the Active signal (H-level signal) (i.e., where it generates the command value). The information of the control channel A being active is sent to the control channel B. On the other hand, when the failure level of the control channel A is greater than that of the other, it brings the control channel A in the standby condition and the information thereof is sent to the control channel B.

FIG. 4 is flowcharts showing the operation of the apparatus 1, more specifically the operation of the control channels A, B.

As illustrated, the left flowchart for the control channel A and the right flowchart for the control channel B are executed concurrently. These programs are executed at predetermined regular intervals, e.g., 10 milliseconds.

The program of the control channel A begins at S10, in which it is determined whether the control channel B is active. When the result is affirmative, the program proceeds to S12, in which the control channel A is brought in the standby condition.

When the result in S10 is negative, the program proceeds to S14, in which it is determined whether a serious failure occurs in the control channel A. The serious failure here means the case where the CPU 82a1 of the control channel A is determined to be abnormal by the watch dog monitor 82a6, or the case where the operating power of the control channel A is decreased, or the case where it is discriminated as the failure level 4. When the result is affirmative, the program proceeds to S12, in which the control channel A is brought in the standby condition.

When the result in S14 is negative, the program proceeds to S16, in which the failure level LA of the control channel A is compared to the failure level LB of the control channel B. When the failure level LA is greater (more abnormal) than the failure level LB, the result in S16 is affirmative and the program proceeds to S12, in which the control channel A is brought in the standby condition. On the other hand, when the failure level LA is smaller (less abnormal) than the failure level LB, the result is negative and the program proceeds to S18, in which the control channel A is brought in the active condition. As mentioned above, the information whether the control channel A is in the active or standby condition is sent to the control channel B.

In the control channel B, the similar program as in the control channel A is executed. Explaining it in detail, the program begins at S20, in which it is determined whether the control channel A is active. When the result is affirmative, the program proceeds to S22, in which the control channel B is brought in the standby condition.

When the result in S20 is negative, the program proceeds to S24, in which it is determined whether a serious failure occurs in the control channel B. The serious failure means similarly to the case of the control channel A. When the result is affirmative, the program proceeds to S22, in which the control channel B is brought in the standby condition.

When the result in S24 is negative, the program proceeds to S26, in which the failure level LB of the control channel B is compared to the failure level LA of the control channel A. When the failure level LB is greater than the failure level LA, the result in S26 is affirmative and the program proceeds to S22, in which the control channel B is brought in the standby condition. On the other hand, when the failure level LB is smaller than the failure level LA, the result is negative and the program proceeds to S28, in which the control channel B is brought in the active condition. As mentioned above, the information whether the control channel B is in the active or standby condition is sent to the control channel A.

As stated above, the embodiment is configured to have an apparatus (1) for and method of controlling an aeroplane gas turbine engine (10) having a plurality of sensors (N1 sensor 62, N2 sensor 64, etc), a plurality of devices (fuel metering valve (FMV) 32, bleed off valve (BOV) 39a) for operating the engine, and two control channels (channel A, B) each including a command value calculation unit (CPU 82a1, 82b1) that calculates a command value (FMV drive command value, BOV drive command value) for controlling operation of the engine through the devices based on signals outputted from the sensors; each of the control channels comprising: a failure level determiner (CPU 82a1, 82b1) that determines whether any of the sensors and the devices is abnormal based on the signals outputted from the sensors and determines a failure level (FIG. 3) of the control channel concerned (e.g., channel A) with a numerical value depending on a degree of abnormality; a transmitter (CAN communication 82c) that transmits the determined failure level to other of the control channels (e.g., channel B); a receiver (CAN communication 82c) that receives the failure level at the other of the control channels; an outputting unit (AND circuit 82a7, 82b7, S16, S26) that compares the failure level of the control channel concerned with that of the other control channel and sends the command value calculated by the command value calculation unit of the control channel of smaller failure level, to the devices for operating the engine. With this, even when both of the two control channels A, B are failed, since one of the control channels of smaller failure level is continuously used to control the engine, it becomes possible to continue the engine control.

In the system and method, each of the control channels A, B includes a monitor (watch dog monitor (WDM) 82a6, 82b6) that monitors whether operation of the command value calculation unit is normal. With this, when one of the command value calculation unit is determined to be not normal by the monitor, the command value calculated by the control channel associated with the thus-determined command value calculation unit is prevented from being outputted to the device, and a command value calculated by the other control channel is outputted to the device. With this, it becomes possible to appropriately control the engine.

Specifically, in the apparatus and method, the failure level determiner determines the failure level of the control channel concerned with the numerical value depending on the degree of the abnormality based on a type and number of the sensor and device determined to be abnormal, as shown in FIG 3.

In the apparatus and method, the outputting unit determines whether a serious failure occurs in the control channel concerned and compares the failure level of the control channel concerned with that of the other control channel when it is determined that no serious failure occurs (S14, S16, S24, S26).

In the apparatus and method, the outputting unit determines whether the other control channel is active and compares the failure level of the control channel concerned with that of the other control channel when it is determined that the other control channel is not active (S10, S16, S20, S26).

It should be noted that, although the two-shaft turbofan engine is taken as an example in the foregoing, the apparatus according to this invention can be applied to the turbojet engine, another type of turbofan engine, the turboprop engine and the turboshaft engine.

Japanese Patent Application No. 2009-192933 filed on Aug. 24, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an aeroplane gas turbine engine having a plurality of sensors, a plurality of devices for operating the engine, and first and second control channels first control channel comprising:
   a first command value calculation unit that calculates a first command value for controlling operation of the engine through the devices based on signals outputted from the sensors;
   a first outputting unit that sends the first command value calculated by the first command value calculation unit to the devices for operating the engine;
   a first failure level determiner that determines whether any of the sensors and the devices is abnormal based on the signals outputted from the sensors, determines that the first control channel is failed if any of the sensors and the devices is determined to be abnormal, and determines a failure level of the first control channel in numerical value depending on degree of abnormality; and
   a first transmitter that transmits the determined failure level of the first control channel to the second control channel, and
   the second control channel comprising:
   a second command value calculation unit that calculates a second command value for controlling operation of the engine through the devices based on signals outputted from the sensors;
   a second outputting unit that sends the second command value calculated by the second command value calculation unit to the devices for operating the engine;
   a second failure level determiner that determines whether any of the sensors and the devices is abnormal based on the signals outputted from the sensors, determines that the second control channel is failed if any of the sensors and the devices is determined to be abnormal, and determines a failure level of the second control channel in numerical value depending on degree of abnormality; and
   a second transmitter that transmits the determined failure level of the second control channel to the first control channel,
   wherein
   the first control channel further comprises a first receiver that receives the failure level of the second control channel transmitted by the second transmitter,
   the second control channel further comprises a second receiver that receives the failure level of the first control channel transmitted by the first transmitter, and
   when both of the first and second control channels are determined to be failed, the first or second outputting units compare the failure levels of the first and second control channels, determines that one of the first and second control channels having a smaller failure level is in an active condition and one of the first and second control channels having a greater failure level is in a standby condition, and sends one of the first and second command values of the one of the first and second control channels in the active condition to the devices for operating the engine.

2. The apparatus according to claim 1, wherein
the first control channel includes a first monitor that monitors whether operation of the first command value calculation unit is normal, and
the second control channel includes a second monitor that monitors whether operation of the second command value calculation unit is normal.

3. The apparatus according to claim 1, wherein
the first failure level determiner determines the failure level of the first control channel in numerical value depending on the degree of the abnormality based on a type and number of the sensor and device determined to be abnormal by the first failure level determiner, and
the second failure level determiner determines the failure level of the second control channel in numerical value depending on the degree of the abnormality based on a type and number of the sensor and device determined to be abnormal by the second failure level determiner.

4. The apparatus according to claim 1, wherein the first outputting unit determines whether a serious failure occurs in the first control channel and compares the failure level of the first control channel with that of the second control channel when it is determined that no serious failure occurs in the first control channel.

5. The apparatus according to claim 1, wherein the first outputting unit determines whether the second control channel is active and compares the failure level of the first control channel with that of the second control channel when it is determined that the second control channel is not active.

6. The apparatus according to claim 1, wherein the step of sending the first command value and the step of sending the second command value includes a step of replacing the control channel to calculate the command value sent to the devices for operating the engine with the other control channel when the failure level of the control channel in the active condition exceeds that of the control channel in the standby condition.

7. The apparatus according to claim 1, wherein when both of the first and second control channels are determined to be failed and the failure level of the first control channel is smaller than the failure level of the second control channel, the first outputting unit determines that the first control channel is in the active condition, and sends the first command value.

8. The apparatus according to claim 1, wherein when both of the first and second control channels are determined to be failed and the failure level of the first control channel is smaller than the failure level of the second control channel, the first outputting unit determines that the first control channel is in the active condition and the second control channel is in the standby condition, and sends the first command value.

9. A method of controlling an aeroplane gas turbine engine having a plurality of sensors, a plurality of devices for operating the engine, and first and second control channels, comprising the steps of:
calculating a first command value for controlling operation of the engine through the devices based on signals outputted from the sensors, by the first control channel;
calculating a second command value for controlling operation of the engine through the devices based on signals outputted from the sensors, by the second control channel;
sending the first command value calculated in the step of calculating the first command value to the devices for operating the engine, by the first control channel;
sending the second command value calculated in the step of calculating the second command value to the devices for operating the engine, by the second control channel;
determining whether any of the sensors and the devices is abnormal based on the signals outputted from the sensors, by the first and second control channels;
determining that the first control channel is failed if any of the sensors and the devices is determined to be abnormal, by the first control channel;
determining that the second control channel is failed if any of the sensors and the devices is determined to be abnormal, by the second control channel;
determining a failure level of the first control channel in numerical value depending on a degree of abnormality, by the first control channel;
determining a failure level of the second control channel in numerical value depending on a degree of abnormality, by the second control channel;
transmitting the determined failure level of the first control channel to the second control channel, by the first control channel;
transmitting the determined failure level of the second control channel to the first control channel, by the second control channel;
receiving the failure level of the second control channel transmitted in the step of transmitting the determined failure level of the second control channel, by the first control channel; and
receiving the failure level of the first control channel transmitted in the step of transmitting the determined failure level of the first control channel, by the second control channel, the steps of sending the first command value and sending the second command value include steps of, when both of the first and second control channels are determined to be failed, comparing the failure levels of the first and second control channels, determining that one of the first and second control channels having a smaller failure level is in an active condition and one of the first and second control channels having a greater failure level is in a standby condition, and sending one of the first and second command values of the one of the first and second control channels in the active condition.

10. The method according to claim 9, further comprising the steps of:
monitoring whether the step of calculating the first command value is normal, by the first control channel; and
monitoring whether the step of calculating the second command value is normal, by the second control channel.

11. The method according to claim 9, wherein
the step of determining the failure level of the first control channel includes determining the failure level of the first control channel in numerical value depending on the degree of the abnormality based on a type and number of the sensor and device determined to be abnormal in the step of determining whether any of the sensors and the devices is abnormal by the first control channel, and
the step of determining the failure level of the second control channel includes determining the failure level of the second control channel in numerical value depending on the degree of the abnormality based on a type and number of the sensor and device determined to be abnormal in the step of determining whether any of the sensors and the devices is abnormal by the second control channel.

12. The method according to claim 9, wherein the step of comparing includes determining whether a serious failure occurs in the first control channel and comparing the failure level of the first control channel with that of the second control channel when it is determined that no serious failure occurs in the first control channel.

13. The method according to claim 9, wherein the step of comparing includes determining whether the second control channel is active and comparing the failure level of the second control channel with that of the first control channel when it is determined that the second control channel is not active.

14. The method according to claim 9, wherein the step of comparing further includes a step of replacing the control channel to calculate the command value sent to the devices for operating the engine with the other control channel when the failure level of the control channel in the active condition exceeds that of the control channel in the standby condition.

15. The method according to claim 9, wherein when both of the first and second control channels are determined to be failed and the failure level of the first control channel is smaller than the failure level of the second control channel, the step of sending the first command value includes determining that the first control channel is in the active condition, and sending the first command value.

16. The apparatus according to claim 9, wherein when both of the first and second control channels are determined to be failed and the failure level of the first control channel is smaller than the failure level of the second control channel, the step of sending the first command value includes determining that the first control channel is in the active condition and the second control channel is in the standby condition, and sending the first command value.

* * * * *